United States Patent [19]

Tarman et al.

[11] Patent Number: 4,579,562

[45] Date of Patent: Apr. 1, 1986

[54] THERMOCHEMICAL BENEFICIATION OF LOW RANK COALS

[75] Inventors: Paul B. Tarman, Elmhurst; Dharamvir Punwani, Bolingbrook, both of Ill.

[73] Assignee: Institute of Gas Technology, Chicago, Ill.

[21] Appl. No.: 610,953

[22] Filed: May 16, 1984

[51] Int. Cl.⁴ ............................ C10L 9/08; C10L 9/10
[52] U.S. Cl. ............................... 44/1 F; 44/2; 48/197 A
[58] Field of Search ............... 44/1 R, 1 F, 1 G, 2; 48/197 A

[56] References Cited

U.S. PATENT DOCUMENTS

| | | | |
|---|---|---|---|
| 4,022,665 | 5/1977 | Ghosh et al. | 48/197 A |
| 4,126,519 | 11/1978 | Murray et al. | 44/1 F |
| 4,127,391 | 11/1978 | Koppelman | 44/1 F |
| 4,129,420 | 12/1978 | Koppelman | 44/1 F |
| 4,170,456 | 10/1979 | Smith | 44/1 F |
| 4,329,156 | 5/1982 | Othmer | 44/1 SR |
| 4,486,959 | 11/1984 | Chang | 44/1 G |

*Primary Examiner*—Carl F. Dees

*Attorney, Agent, or Firm*—Thomas W. Speckman

[57] ABSTRACT

A process and apparatus for thermochemical beneficiation of carbonaceous solids, such as low rank coals and biomass, by countercurrently passing a moving bed of the solids in contact with a liquid in an amount sufficient to flush product liquids having dissolved and suspended products and make-water from the moving bed which is maintained within the wet carbonization reaction zone at about 400° to about 650° and an elevated pressure sufficient to prevent boiling of the liquid. The feed liquid may be preheated in a lower liquid preheat zone of the moving bed and a substantial portion of the liquid removed as heat recovery liquid for other process uses. External heat may be added in the lower portion of the wet carbonization reaction zone. The relatively high concentration of organic materials in the product liquid may advantageously be anaerobically digested producing methane containing gas to provide additional process heat and the liquid effluent vaporized to provide heat to the carbonization reaction zone. The process provides a continuously operating process capable of processing carbonaceous solids of about ¼ inch to about 4 inches in diameter.

32 Claims, 1 Drawing Figure

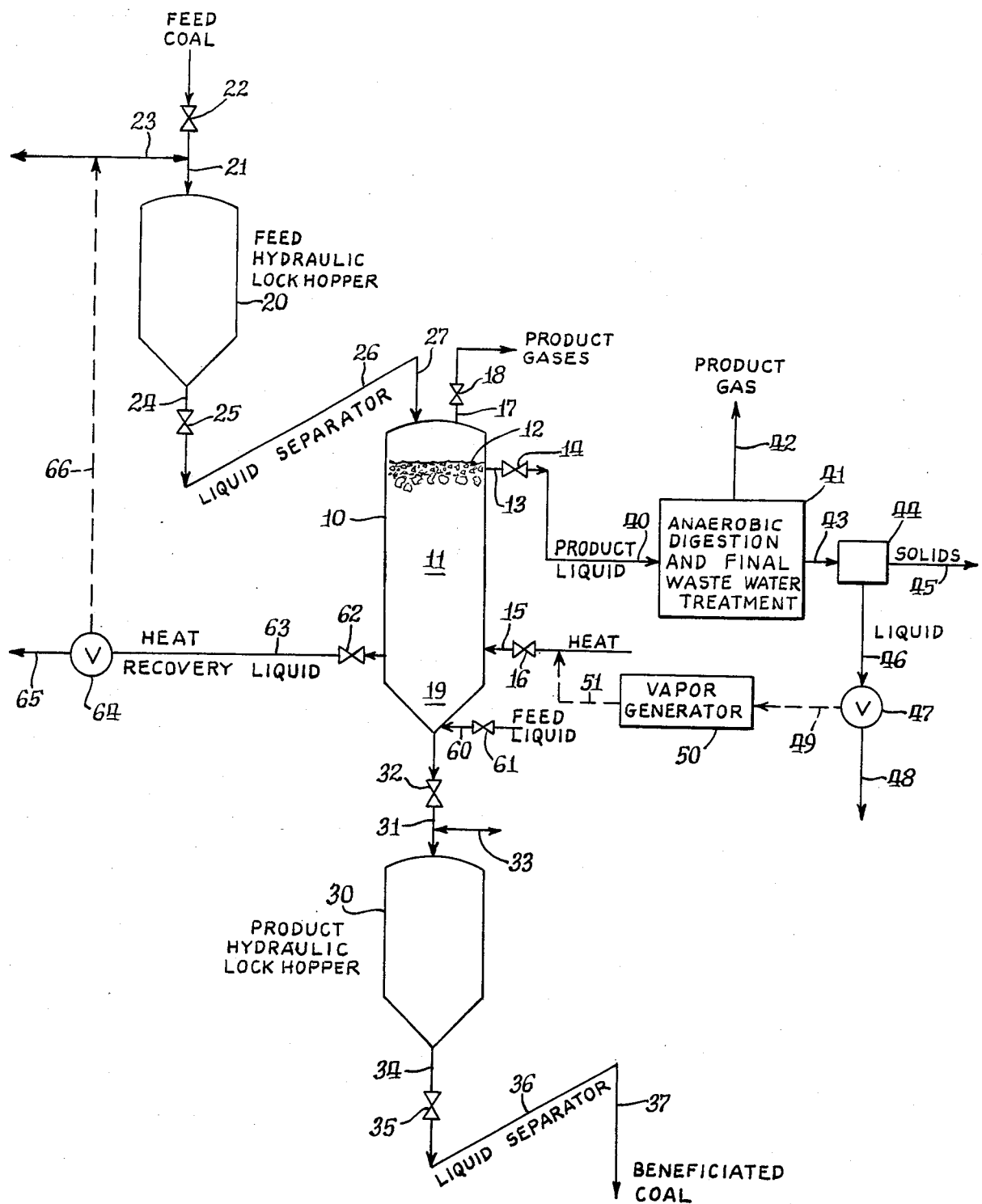

THERMOCHEMICAL BENEFICIATION OF LOW RANK COALS

BACKGROUND OF THE INVENTION

1. Field of the Invention

This invention relates to an improved process and apparatus for the thermochemical beneficiation of carbonaceous materials, such as low rank coals, wherein the heating value of lump-size, low rank coal is chemically upgraded, its high inherent moisture content is reduced, mechanical handling characteristics are improved, and sodium content is reduced.

2. Description of the Prior Art

Deposits of low rank coals, such as lignite, subbituminous, and brown coal, represent one of the largest fossil fuel resources in the world. Most of the low rank coal deposits can be mined at a low cost relative to other fossil fuel sources. Low rank coals, in addition, have a very low sulfur content and thus when combusted, sulfur emission is very low.

Utilization of low rank coals and biomass materials, however, has been limited due to the high inherent moisture content of those coals. Low rank coals may contain about 30 to about 70 weight percent water. This factor combined with the typically low heating values of low rank coals has made the utilization of low rank coals as an energy source, economically unattractive.

One principal objective in the beneficiation of carbonaceous materials such as low rank coals and biomass materials, is to efficiently reduce their high inherent water content and to increase the heating value of the carbonaceous material. Air drying methods for carbonaceous materials, such as low rank coals, are not preferred because they have high energy requirements, they do not improve the heating value of the coal and the air dried coal readily decrepitates and reabsorbs moisture. Alternatives to air drying include steam treatment and hot water treatment of the carbonaceous materials, such as low rank coals.

The Fleissner process for steam drying lump-size low rank coals is described in U.S. Pat. Nos. 1,632,829 and 1,679,078. The objective was to produce a stable coal lump which could be easily and economically transported. The Fleissner process utilizes batch autoclaves which are operated sequentially to achieve preheating, steaming, depressurization, and air blowing. In practice, coal lumps up to 8 inches in diameter can be treated in this process, but removal, by preliminary screening, removes coal lumps smaller than ⅜ inch in diameter. Coal lumps finer than ⅜ inch, therefore, are not treated by this drying process and retain their high inherent moisture content and low heating value. Since the Fleissner process can only be operated as a batch process, it cannot economically be adapted for use in large scale operations.

Several other autoclaving treatments of coal are known. U.S. Pat. No. 3,552,031 discloses a process for separating moisture from organic materials wherein organic material is heated in an autoclave to temperatures between 100° and 300° C. in the presence of water at pressures greater than the saturation pressure. U.S. Pat. No. 3,007,259 teaches heating organic substrate with water and pressurized steam to about 200° C. and then sequentially cooling the treated material. U.S. Pat. No. 2,966,400 teaches the use of a rotary preheating kiln in conjunction with a rotary processing kiln wherein temperatures are maintained at about 550° to 650° F., and steam reaches temperatures of 600° to 1000° F. A process for stabilizing lignite and subbituminous coal in which coal is dried to essentially zero moisture content and then partially rehydrated with steam is disclosed in U.S. Pat. No. 4,192,650.

The Koppelman process, described in U.S. Pat. No. 4,052,168, yields an upgraded product from low rank coal having a significantly reduced water content and an increased heating value. The Koppelman process uses a slurry system for feeding the coal and employs a conventional lockhopper system for discharging beneficiated product. This beneficiation process employs an autoclaving treatment which operates at about 1000° F., at which temperature a significant portion of the coal is pyrolized. Due to pyrolysis, only about 55 percent of the dry coal feed is recovered as beneficiated product.

Several other slurry feed systems for beneficiating coal are known. U.S. Pat. Nos. 3,992,784 and 4,080,176 teach a process for thermal dewatering of brown coal which uses fine size low rank coals and employs a slurry feed system. The pumpable slurry is heated to temperatures above 150° C. and pressure is maintained above the vapor pressure of water. A process developed in Finland known as the PDF Process for wet carbonizing peat also employs a slurry feed system to beneficiate only fine size low rank coals. U.S. Pat. No. 2,668,099 teaches a slurry system wherein a substantial portion of the heat requirement is supplied by subjecting the feed material, under pressure, to oxygen containing gas so that a portion of the material is oxidized to yield heat energy.

Because slurry systems require large volumes of water to be processed, complex and expensive heat exchange equipment is required to achieve high energy efficiency. Dewatering equipment costs are correspondingly high for the slurry systems. Moreover, transport of the beneficiated fine size low rank coal from the site of the beneficiation requires slurry pipelines or briquetting of the fine size coal for transport by rail or other means.

Hot water treatment is taught in U.S. Pat. No. 1,965,513 wherein fuel is immersed in water and heated to temperatures between 150° and 250° C. at the pressure of saturated water vapor.

U.S. Pat. No. 4,400,176 discloses a process of coal beneficiation wherein the inherent water content of the coal is reduced, at relatively low temperatures of about 220° to about 500° F., by contacting the coal with an acidic material, such as a carboxylic organic acid containing up to about 6 carbon atoms, phenol, phenolic acids or inorganic acids, during the thermal treatment. U.S. Pat. No. 4,014,104 teaches the addition of a non-aqueous solvent before heating and U.S. Pat. No. 2,610,115 discloses a method for heating solid fuel in the presence of a mineral hydrocarbon binder.

The process and apparatus of the present invention utilizes a thermochemical process of wet carbonization for beneficiating carbonaceous materials, such as low rank coals, including increasing the heating value and decreasing moisture, and which has several advantages over prior art processes. The process of this invention utilizes liquid sealed lockhoppers and can accommodate feed solids lump sizes up to about 4 inches in diameter. The process of this invention does not employ a slurry system which limits the solid particle size and requires complex heat recovery equipment. Beneficiation of carbonaceous low rank coals according to the process of this invention reduces the high inherent moisture content and increases the heating value of low rank coals, in addition to providing further advantages described below. Moreover, the wet carbonization beneficiation process of the present invention is energy efficient and economically superior to prior processes for use in large scale commercial operations.

SUMMARY OF THE INVENTION

Beneficiated low rank coals may be utilized as a substitute energy source for desulfurized high Btu content bituminous coals. Low rank coals represent one of the largest fossil fuel resources in the United States, can be mined at a low cost, and have a low sulfur content. Numerous disadvantages, however, have limited the utilization of low rank coals.

Low rank coals and other carbonaceous solids have a high inherent moisture content, ranging between about 30 and about 70 weight percent water. Additionally, low rank coals typically have a low heating value. The combination of these properties renders low rank coals very costly to transport and significantly increases the size and complexity of combustion equipment required to produce any fixed amount of thermal energy. Furthermore, low rank coals typically contain a relatively high sodium content, up to 1.3 weight percent sodium, which leads to ash fouling when the coal is combusted. Additionally, air dried low rank coals are highly reactive with air, and spontaneous ignition is not uncommon. Such coals exhibit very poor mechanical handling characteristics, and consequently, physical degradation of low rank coals occurs.

The above disadvantages of low rank coals must be overcome before low rank coals can replace or compete with desulfurized high Btu content bituminous coals to provide thermal energy for industrial processes. The process and apparatus of the present invention provides beneficiation of lump-size low rank coals by wet carbonization. Thermochemical beneficiation by the process of the present invention provides advantages over presently known slurry feed systems, steam drying systems, and air drying systems.

The thermochemical process for beneficiating carbonaceous solids, such as low rank coals, according to this invention utilizes a pressurized reactor wherein lump size feed about ¼ inch to about 4 inches in diameter, is introduced to the upper portion and flows downwardly through the reactor as a packed bed countercurrent to liquid which flows upwardly through the reactor. The feed solids are first pressurized in at least one hydraulic lockhopper which may be of any design known to the art which performs similar functions as the hydraulic lockhopper taught by U.S. Pat. No. 3,729,105. Hydraulic lockhopper systems are preferred for use in the apparatus and process of this invention since they consume considerably less energy than comparable pneumatic lockhoppers, cycle more rapidly, and can deliver the same feed rate as a larger, more cumbersome pneumatic lockhopper. Beneficiated coal discharged from the wet carbonization reactor is also processed through a hydraulic lockhopper system.

Carbonaceous solids, such as low rank coal lumps, ranging in size from about ¼ inch to about 4 inches in diameter, preferably about ¼ inch to about 3 inches, are charged into a feed hydraulic lockhopper and hydraulically pressurized. Feed solids are conveyed from the lockhopper to the upper portion of a wet carbonization reactor by means of a liquid separator conveyor, such as a helical screw, or through a solids-liquid separator such as described in U.S. Pat. No. 4,247,240. Feed solids entering the wet carbonization reactor have very little surface water.

In the wet carbonization reactor, the carbonaceous solids, such as low rank coal, are heated in the presence of a liquid medium to temperatures in the range of about 400° to about 650° F. at pressures sufficient to prevent vaporization. The liquid may be water or any other liquid which will not react adversely with the solids being treated and will remain in liquid phase at the pressure and temperature in the reactor, and will provide intimate contact and thermal transfer with the solid lumps in a moving bed system. The density of the liquid used is desirably less than the density of the solids being treated. For example, when biomass solids are treated, light organic liquids are desirably used. Suitable pressures in the wet carbonization reactor are about 300 and about 2300 psig, depending upon the temperature and the liquid used. The pressure is maintained at about 30 to about 70 psig, preferably about 45 to about 55 psig above the saturation vapor pressure of the liquid. The solids being treated flow downwardly through the wet carbonization reactor as a packed bed, countercurrent to liquid moving upwardly through the reactor. The solids flow rate is adjusted to achieve a residence time of about 10 to about 60 minutes, preferably about 20 to about 40 minutes, depending upon the particular type and particle size of carbonaceous material, such as low rank coal, being treated. The minimum liquid upflow should be sufficient to remove the liquid soluble, suspended solids, and make-water products of wet carbonization and to prevent their buildup in the reaction zone.

During the wet carbonization process, carboxyl groups in the low rank coals decompose to form, primarily, carbon dioxide and product water. It is believed that the carbon dioxide gas forces liquid water out of pores in the low rank coal and causes the pores to shrink. Additionally, the surface of the coal is modified by the hydrophilic carboxyl groups present on the surface of the coal being replaced by hydrophobic hydrocarbon groups. The high sodium content of low rank coals is reduced due to the existence of sodium as metal ions which are present in conjunction with the carboxyl groups on the surface of the coal and the release of sodium when the carboxyl groups are decomposed. The sodium is then carried away by the liquid phase.

The desired temperature may be maintained in the wet carbonization zone by any method of heat addition, such as by feeding additional liquids or solids, superheated vapors and/or heated oxygen/air to the lower portion of a carbonization zone. The solids feed may be preheated in the feed lockhopper or at any point before being introduced into the reactor. The hot beneficiated solids product, leaving the wet carbonization zone may be cooled by passing through a liquid preheat zone where the sensible heat of the solids is transferred by direct heat exchange with upflowing liquid. This liquid preheat zone may be incorporated into either the lower portion of the reactor vessel or in the product lockhopper. The minimum liquid flow in the liquid preheat zone should be sufficient to remove a substantial amount of sensible heat from the hot beneficiated solids. A major portion of this liquid may be removed from the upper portion of the liquid preheat zone as heat recovery liquid prior to entry to the wet carbonization zone to reduce the liquid flow in the wet carbonization zone and to provide heat for other process uses. Heat recovered during this heat exchange may be utilized to preheat feed solids, such as in the feed lockhopper. Further preheat of the solids is achieved in the upper portion of the wet carbonization zone as the feed solids pass downwardly in direct heat exchange with the upward moving liquid in the upper portion of the wet carbonization zone.

Product gas, comprising primarily carbon dioxide, is continuously vented from near the top of the wet carbonization reactor to maintain the desired pressure in the reactor. The liquid level in the reactor is maintained by the continuous removal of product liquid from the upper portion of the reactor. Product liquid removed from the wet carbonization reactor contains dissolved organic and inorganic materials, suspended solids, and make-water. Due to the low amount of liquid passed through the wet carbonization zone, high organics concentration will result. This product liquid may be utilized as feed for anaerobic digestion for conversion of the dissolved organic carbonaceous material in the product liquid to a usable fuel gas comprising methane. Anaerobic digestion of the product liquid increases the efficiency of the overall coal beneficiation process and reduces the cost of downstream waste liquid treatment. Liquid which has undergone anaerobic digestion treatment may be recycled for vapor generation to heat the contents of the wet carbonization reactor.

Beneficiated solids which are discharged from the wet carbonization reactor are depressurized in a hydraulic lockhopper, and again passed through a solids/liquid separator to remove surface liquid from the beneficiated solids. Beneficiated coal is suitable for utilization as a source of thermal energy.

The chemical modification of low rank coals which is achieved during this beneficiation process chemically upgrades the heating value of low rank coals. Modification of the surface characteristics of the low rank coals reduces both the ability of the coal to bind water and the tendency of the coal to decrepitate upon weathering. The exterior surfaces of low rank coals beneficiated according to this wet carbonization process are also less susceptible to mechanical degradation. The beneficiated coal product retains its original lump form, and is readily transported by rail, truck, or other means. Coal beneficiation according to this wet carbonization technique can be performed at the mine site as it does not require complex equipment, and it has very low energy requirements. The wet carbonization low rank coal beneficiation process according to this invention may be economically adapted to large scale operations.

Accordingly, it is an object of this invention to provide thermochemical beneficiation of carbonaceous solids, such as low rank coals and biomass, which reduces the inherent moisture content and enhances the heating value of solids.

It is still another object of this invention to provide thermochemical beneficiation of low rank coals wherein mechanical handling properties of the low rank coal are improved, thereby reducing the tendency of the low rank coal to be physically degraded.

It is a further object of this invention to provide thermochemical beneficiation of low rank coals wherein the surface properties of low rank coals which cause spontaneous ignition are modified to reduce spontaneous ignition of the beneficiated coal product.

It is another object of this invention to provide thermochemical beneficiation of low rank coals which reduces sodium content of the coal and thereby reduces ash fouling upon combustion.

It is still another object of this invention to provide thermochemical beneficiation of lump-size carbonaceous solids, such as low rank coals ranging in size from about ¼ inch to about 4 inches in diameter.

It is a further object of this invention to provide thermochemical beneficiation of carbonaceous solids, such as low rank coals, which is energy efficient and can be adapted for use in large scale operations.

BRIEF DESCRIPTION OF THE DRAWING

The above mentioned and other additional features of this invention will become apparent, and the invention will be best understood by reference to the following description of preferred embodiments of the invention read in conjunction with the drawing wherein:

The FIGURE shows a schematic representation of one embodiment of an apparatus for carrying out the process of this invention.

DESCRIPTION OF THE PREFERRED EMBODIMENTS

As shown in the FIGURE, solids feed is delivered through solids feed lockhopper inlet conduit 21 to solids feed hydraulic lockhopper 20. The flow rate of the solids feed entering solids feed hydraulic lockhopper 20 is regulated by solids feed lockhopper inlet control valve 22. Liquids may be removed from or added to lockhopper 20 by means of hydraulic lockhopper liquid control conduit 23 which provides desired pressurizing and depressurizing. Solids feed hydraulic lockhopper 20 may be of any suitable design known to the art, such as that disclosed in U.S. Pat. No. 3,729,105, which achieves desired hydraulic pressurization and depressurization. The solids feed may comprise any type or mixture of low rank coals or biomass materials which have a lump size between about ¼ inch and about 4 inches in diameter. Although the low rank coal feed may comprise a mixture of low rank coals, coal feed comprising a single type of low rank coal is preferred, as operating conditions may be adjusted to achieve the most advantageous beneficiation of a single type of coal.

Solids feed is discharged from solids feed hydraulic lockhopper 20 through solids feed lockhopper outlet conduit 24 and regulated by solids feed lockhopper outlet control valve 25. The solids then pass solids/liquid separator, such as a suitable dewatering screw 26. Any other type solids/liquid separator-conveyor, such as shown in U.S. Pat. No. 4,247,240 may be used. Solids feed is delivered to wet carbonization reactor 10 through solids feed conduit 27 and is substantially free of surface liquids.

Wet carbonization reactor 10 comprises a head space zone between the top of the reactor and liquid surface 12, a solids moving bed carbonization zone 11 having an upper solids preheat zone and a lower carbonization reaction zone, and a liquid preheat zone 19 in the lower portion of the reactor. In solids moving bed carbonization zone 11, densely packed solids feed moves downwardly countercurrent to upwardly moving liquid. The liquid which flows countercurrent to the densely packed solids may be any liquid which may be heated to desired carbonization temperatures and beneficially upgrade the carbonaceous feed solids, such as low rank coal, while providing a carrier for biodegradable products. Generally, water is suitable when beneficiating low rank coals and lighter organic liquids are suitable when beneficiating biomass. Feed liquid is introduced near the base of wet carbonization reactor 10 through feed inlet conduit 60, at a rate controlled by feed liquid inlet control valve 61.

In the carbonization reaction zone of solids moving bed 11, the temperature is maintained between about 400° and about 650° F. Thermal energy is conveyed to carbonization reaction zone of solids moving bed 11 through reactor heat input 15, and regulated by reactor heat input control 16. Heat input to carbonization zone 11 is preferably in the form of superheated steam and/or oxygen/air, but may be any known method of heat addition which does not interfere with the desired wet carbonization reaction.

The pressure in wet carbonization reactor 10 must be maintained sufficiently high to prevent boiling of the liquid used. The pressure in wet carbonization reactor 10 may suitably range between about 300 to about 2300 psig, depending upon the temperature in the reactor and the density of the solids moving bed. The pressure is maintained at about 30 to about 70, preferably about 45 to about 55 psi, above the saturation vapor pressure of the liquid at the temperature of the carbonization zone.

The flow rate of the solids through solids moving bed carbonization reaction zone may be adjusted to achieve a solids feed residence time in solids moving bed carbonization reaction zone of about 10 to about 60 minutes. Desired residence times may vary, depending upon the particular type of low rank coal or biomass being treated and the average lump size.

Product gases which are generated during the wet carbonization treatment, primarily carbon dioxide, are removed at or near the top of wet carbonization reactor 10 through product gas conduit 17. Removal of product gases is regulated by product gas control valve 18 to maintain the desired pressure in the reactor.

Substantial heat recovery from the hot solids may be accomplished in liquid preheat zone 19 as downwardly flowing hot beneficiated solids pass countercurrent to upwardly flowing relatively cool liquid introduced through liquid supply conduit 60 and controlled by control means 61 providing pressure and flow rate control. A portion of the liquid which has been heated by downwardly flowing feed solids may be removed from the upper region of liquid preheat zone 19 through heat recovery liquid conduit 63, the rate of removal regulated by heat recovery liquid control 62. In a preferred embodiment, sufficient liquid may be passed through liquid preheat zone 19 to provide substantial direct heat transfer from the hot solids. Withdrawal of a substantial volume of the preheated liquid through conduit 63 prior to liquid entry to the wet carbonization reaction zone reduces the heat input requirements for the reaction zone and provides desirably high concentrations of dissolved and suspended organic materials in the product liquid. Recovered sensible heat may be used for preheating feed solids by recycling heat recovery liquid through heat recovery liquid recycle conduit 66, regulated by heat recovery liquid control valve 64. Preheated liquid may be conveyed for other uses through heat recovery discharge conduit 65 regulated by control valve 64. Liquid conveyed through recycle conduit 66 may be introduced into solids feed hydraulic lockhopper 20 through hydraulic lockhopper liquid control conduit 23, and serves to preheat the solids feed.

Product liquid is removed from the upper portion of solids moving bed 11 at or below liquid surface 12 through product liquid conduit 13. The rate of removal is controlled by product liquid control valve 14, to maintain liquid surface 12 at an appropriate height and to maintain sufficient pressure in wet carbonization reactor 10.

The product liquid, comprising dissolved and suspended organic material released from the low rank coals or biomass materials, is conveyed through liquid product conduit 40 to anaerobic digester 41. Anaerobic digestion of the product liquid which is enriched in organic material yields product gas, comprising methane, which may be removed through digester product gas conduit 42. Liquid and solids which have undergone anaerobic digestion and biological materials and sludge produced in the digester are removed through digester effluent liquid/solids conduit 43 and treated in digester effluent liquid/solids separator 44. The liquid effluent in conduit 46 comprises in addition to the reactor feed liquid, liquid used in the hydraulic lockhopper and products from the wet carbonization reactor, such as make-water. Solids are removed through digester effluent solids conduit 45 for further processing or disposal, and liquids are removed through digester effluent liquids conduit 46. It may also be desirable to separate water or other liquids from the principal liquid material. Any suitable anaerobic digestion system for production of methane may be used. Preferably two stage anaerobic digestion, such as disclosed in U.S. Pat. No. 4,022,665 may be used.

Digester effluent liquids may be recycled for use in the beneficiation process, by directing them through digester effluent liquid recycle conduit 49. The flow of liquids is regulated by digester effluent liquid control valve 47 which directs liquids into digester effluent liquid discharge conduit 48 or recycle conduit 49. Recycled liquids may be processed in vapor generator 50, and conveyed as vapor through vapor feed conduit 51 to provide thermal energy to drive the wet carbonization process.

The discharge of feed solids from wet carbonization reactor 10 is regulated by solids product lockhopper inlet control valve 32. Beneficiated solids are delivered through solids product lockhopper inlet conduit 31 to solids product hydraulic lockhopper 30, where they are hydraulically depressurized, the pressurizing and depressurizing being effected through pressure control conduit 33 by means known to the art. Beneficiated solids are discharged from product hydraulic lockhopper 30 through solids product lockhopper outlet conduit 34, and are fed to liquid separator means 36 through solids product lockhopper outlet control valve 35. Liquid separator means 36 may comprise a solids/liquid separator, a dewatering screw, or similar means by which substantially all of the surface liquid is removed from the beneficiated solids. Beneficiated solids are conveyed through solids product conduit 37 to any storage or collection means or for use.

The apparatus of this invention may be constructed of materials and components apparent to one skilled in the art upon reading this disclosure. Likewise, the specific design and sizing parameters of specific embodiments will be apparent to one skilled in the art upon reading this disclosure.

While in the foregoing specification this invention has been described in relation to certain preferred embodiments thereof, and many details have been set forth for purpose of illustration, it will be apparent to those skilled in the art that the invention is suceptible to various additional embodiments and that certain of the details described herein may be varied considerably without departing from the basic principles of the invention.

We claim:

1. A process for thermochemical beneficiation of carbonaceous solids comprising: introducing feed solids substantially free of surface liquids in sizes about ¼ inch to about 4 inches in diameter to an upper portion of a pressurized wet carbonization reactor and maintaining said solids as moving packed bed within said wet carbonization reactor; introducing liquid to a lower portion of said wet carbonization reactor and passing said liquid upwardly in contact by countercurrent flow with said solids in said moving bed in an amount sufficient to flush product liquids comprising dissolved and suspended products and make-water from said moving bed; maintaining within said moving packed bed a wet carbonization reaction zone at about 400° to about 650° F.; maintaining an elevated pressure sufficient to prevent boiling of said liquid within said wet carbonization reactor; maintaining said solids in said wet carbonization reaction zone for an average residence time of about 10 to about 60 minutes to produce said dissolved and suspended products and make-water thereby beneficiating said solids; withdrawing product gases and product liquid from the upper portion of said wet carbonization reactor and withdrawing beneficiated solids from the lower portion of said wet carbonization reactor.

2. The process of claim 1 wherein said feed solids are preheated by direct heat exchange with said liquid in the upper portion of said moving bed.

3. The process of claim 1 wherein said liquid is preheated by direct heat exchange with said solids in the lower portion of said moving bed.

4. The process of claim 1 wherein said feed solids are preheated by direct heat exchange with said liquid in the upper portion of said moving bed and said liquid is preheated by direct heat exchange with said solids in the lower portion of said moving bed.

5. The process of claim 1 wherein heat is added to said upwardly passing liquid in the lower portion of said wet carbonization reaction zone.

6. The process of claim 1 wherein said liquid is preheated by direct heat exchange with said solids in the lower portion of said moving bed and a substantial portion of said preheated liquid is withdrawn from said moving bed below said wet carbonization reaction zone.

7. The process of claim 6 wherein said withdrawn preheated liquid is passed in contact with said feed solids prior said feed solids being introduced into said moving bed.

8. The process of claim 1 wherein said liquid is preheated by direct heat exchange with said solids in the lower portion of said moving bed and a substantial portion of said preheated liquid is withdrawn from said moving bed below said wet carbonization reaction zone and heat is added to said upwardly passing liquid in the lower portion of said wet carbonization reaction zone.

9. The process of claim 8 wherein said product liquid is subjected to anaerobic digestion to produce anaerobic digestion product gas comprising methane.

10. The process of claim 1 wherein product liquid is subjected to anaerobic digestion to produce anaerobic digestion product gas comprising methane.

11. The process of claim 10 wherein liquid effluent from said anaerobic digestion is vaporized and recycled to the lower portion of said wet carbonization reaction zone to supply heat.

12. The process of claim 1 wherein said pressure is about 30 to about 70 psig above the saturation vapor pressure of said liquid.

13. The process of claim 1 wherein said feed solids are about ¼ inch to about 3 inches in diameter.

14. The process of claim 1 wherein said residence time in said wet carbonization reaction zone is about 20 to about 40 minutes.

15. The process of claim 1 wherein said introducing said feed solids and said withdrawing said beneficiated solids is performed on a continuous basis.

16. The process of claim 1 wherein said carbonaceous solids comprise low rank coals.

17. The process of claim 16 wherein said feed coal is preheated by direct heat exchange with said liquid in the upper portion of said moving bed and said liquid is preheated by direct heat exchange with said coal solids in the lower portion of said moving bed.

18. The process of claim 16 wherein said liquid is preheated by direct heat exchange with said coal solids in the lower portion of said moving bed and a substantial portion of said preheated liquid is withdrawn from said moving bed below said wet carbonization reaction zone.

19. The process of claim 16 wherein said liquid is preheated by direct heat exchange with said coal solids in the lower portion of said moving bed and a substantial portion of said preheated liquid is withdrawn from said moving bed below said wet carbonization reaction zone and heat is added to said upwardly passing liquid in the lower portion of said wet carbonization reaction zone.

20. The process of claim 19 wherein said product liquid is subjected to anaerobic digestion to produce anaerobic digestion product gas comprising methane.

21. The process of claim 16 wherein said introducing said feed coal and said withdrawing said beneficiated coal is performed on a continuous basis.

22. The process of claim 1 wherein said carbonaceous solids comprise biomass.

23. The process of claim 22 wherein said feed biomass is preheated by direct heat exchange with said liquid in the upper portion of said moving bed and said liquid is preheated by direct heat exchange with said biomass solids in the lower portion of said moving bed.

24. The process of claim 22 wherein said liquid is preheated by direct heat exchange with said biomass solids in the lower portion of said moving bed and a substantial portion of said preheated liquid is withdrawn from said moving bed below said wet carbonization reaction zone.

25. The process of claim 22 wherein said liquid is preheated by direct heat exchange with said biomass solids in the lower portion of said moving bed and a substantial portion of said preheated liquid is withdrawn from said moving bed below said wet carbonization reaction zone and heat is added to said upwardly passing liquid in the lower portion of said wet carbonization reaction zone.

26. The process of claim 25 wherein said product liquid is subjected to anaerobic digestion to produce anaerobic digestion product gas comprising methane.

27. The process of claim 22 wherein said introducing said feed biomass and said withdrawing said beneficiated biomass is performed on a continuous basis.

28. An apparatus for beneficiating carbonaceous solids comprising: a wet carbonization reactor vessel for confining a downwardly moving bed of carbonaceous solids; means for introducing feed carbonaceous solids substantially free of surface liquid to the upper portion of said reactor vessel; means for introducing feed liquid to the lower portion of said reactor; means for withdrawing heat recovery liquid from said reactor below a wet carbonization reaction zone and means for withdrawing product liquid from said reactor at the upper portion of said moving bed; means for maintaining said wet carbonization reaction zone at about 400° to about 650° F.; means for maintaining an elevated pressure sufficient to prevent boiling of said liquid; means for withdrawing product gases from the headspace of said reactor; and means for withdrawing beneficial solids from the lower portion of said moving bed.

29. An apparatus of claim 28 wherein said means for introducing feed carbonaceous solids and said means for withdrawing beneficiated solids each comprise hydraulic lockhopper means.

30. An apparatus of claim 28 additionally comprising anaerobic digestion means fed by said means for withdrawing product liquid.

31. An apparatus of claim 30 additionally comprising means for vaporizing liquid effluent from said digestion means and passing said vapor to the lower portion of said wet carbonization reaction zone.

32. An apparatus of claim 28 additionally comprising means for passing said withdrawn heat recovery liquid in contact with said feed carbonaceous solids prior to their introduction into said reactor.

* * * * *